US012134991B1

(12) United States Patent
Chenoweth et al.

(10) Patent No.: US 12,134,991 B1
(45) Date of Patent: Nov. 5, 2024

(54) MONITORING SYSTEM FOR A GASEOUS FUEL SUPPLY TO AN ENGINE AT A WELLBORE

(71) Applicant: Halliburton Energy Services, Inc., Houston, TX (US)

(72) Inventors: Brenden Chenoweth, Norman, OK (US); Timothy Holiman Hunter, Duncan, OK (US); Christopher Ryan Almon, Duncan, OK (US); Austin Carl Schaffner, Bixby, OK (US); Billy D. Coskrey, Duncan, OK (US); Adam Lynn Marks, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/240,932

(22) Filed: Aug. 31, 2023

(51) Int. Cl.
*F02D 41/00* (2006.01)
*F02D 41/14* (2006.01)

(52) U.S. Cl.
CPC ..... *F02D 41/0027* (2013.01); *F02D 41/1446* (2013.01); *F02D 2041/1412* (2013.01); *F02D 2200/0611* (2013.01)

(58) Field of Classification Search
CPC ............. F02D 41/0027; F02D 41/1446; F02D 2041/1412; F02D 2200/0611
See application file for complete search history.

(56) References Cited

U.S. PATENT DOCUMENTS

| | | | | |
|---|---|---|---|---|
| 9,677,764 | B2 | 6/2017 | Knapp et al. | |
| 9,810,428 | B2 | 11/2017 | Knapp et al. | |
| 9,932,910 | B2 | 4/2018 | Hunter | |
| 10,393,712 | B2 | 8/2019 | Li | |
| 2017/0022919 | A1* | 1/2017 | Rebinsky | F02M 21/0227 |
| 2019/0293012 | A1* | 9/2019 | Asai | F02M 27/02 |
| 2023/0116609 | A1* | 4/2023 | Guglielmo | F02D 19/0642 701/104 |

* cited by examiner

*Primary Examiner* — Sizo B Vilakazi
(74) *Attorney, Agent, or Firm* — Kilpatrick Townsend & Stockton LLP

(57) ABSTRACT

A gaseous fuel supply to an engine at a wellbore can be monitored using a monitoring system. The monitoring system can include a sensor apparatus having sensors configured to monitor the fuel supply of the engine. The fuel supply can be transported within a fuel supply line of a wellsite. The monitoring system can divert a portion of the fuel supply of the engine from the fuel supply line to a fuel sampling line. The monitoring system can analyze the portion of the fuel supply using the sensor apparatus to determine a fuel property measurement of the fuel supply. Additionally, the monitoring system can determine that the fuel property measurement is outside of a predefined range associated with a target performance level of the engine. In response, the monitoring system can perform a mitigation operation to cause the fuel supply to enable the target performance level of the engine.

20 Claims, 6 Drawing Sheets

MONITORING SYSTEM FOR A GASEOUS FUEL SUPPLY TO AN ENGINE AT A WELLBORE

TECHNICAL FIELD

The present disclosure relates generally to wellsite fuel systems and, more particularly (although not necessarily exclusively), to a monitoring system for a gaseous fuel supply to an engine at a wellbore.

BACKGROUND

Performing operations, such as drilling or completion operations, at a wellsite entails various steps, each using a number of wellsite equipment. For instance, at the wellsite, there may be various fracturing equipment on location that require power. Often, each wellsite equipment can be powered by an engine consuming gaseous fuel. The various wellsite equipment may rely on diesel engines or dual-fuel engines that consume a mixed fuel containing natural gas and diesel for power. The various wellsite equipment can be damaged or fail when the gaseous fuel flowing to the engines from a fuel source, such as from a fuel tank or hydrocarbon-producing wellbore, is outside of a predefined range specific to the piece of wellsite equipment. Equipment failure can lead to a loss of well control or other hazards.

DETAILED DESCRIPTION

Figure 1:
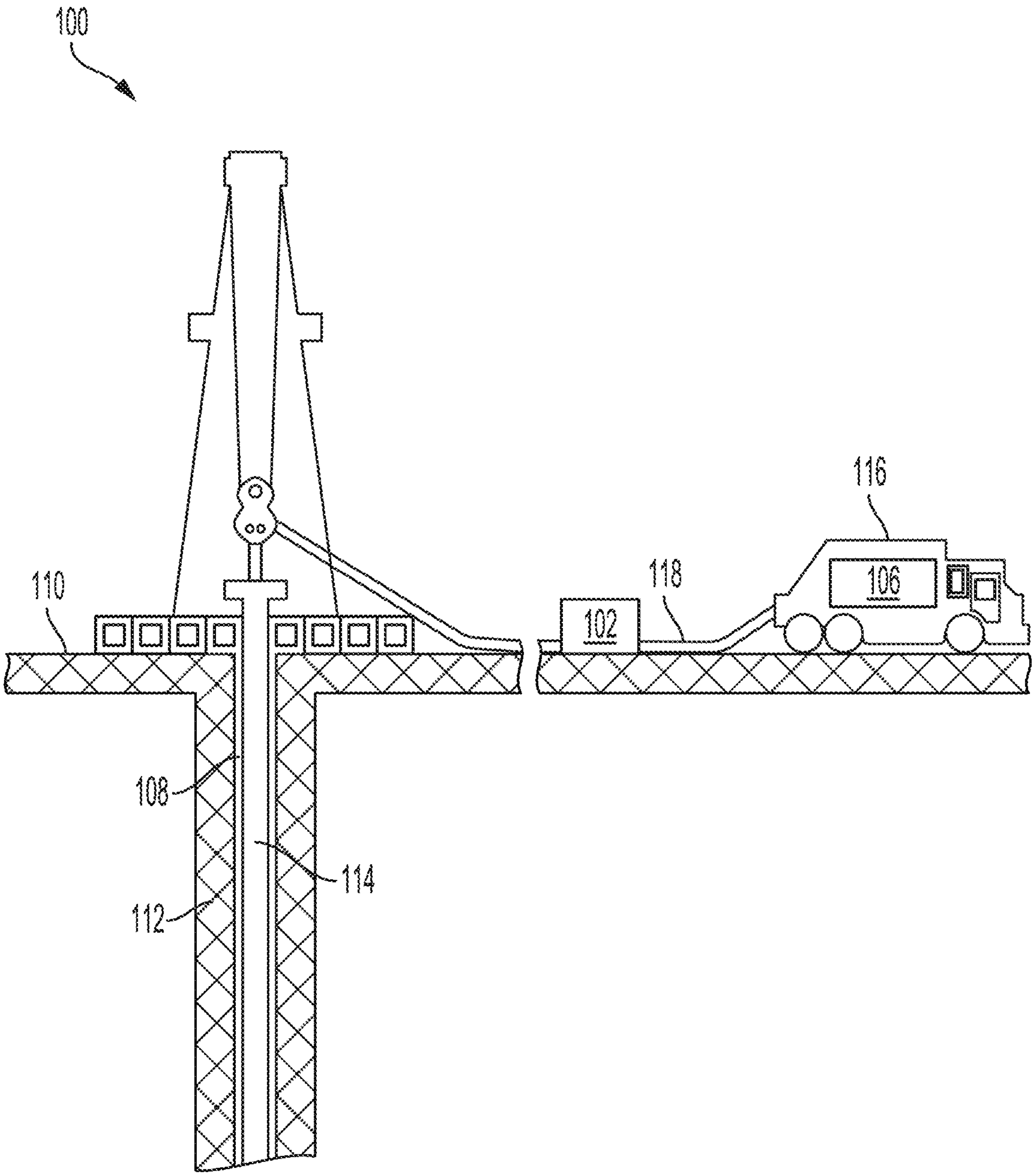
FIG. 1 is a schematic of a wellsite that includes a monitoring system for a gaseous fuel supply to an engine according to one example of the present disclosure.

Certain aspects and examples of the present disclosure relate to a monitoring system for a fuel supply to an engine at a wellsite that consumes gaseous fuel or liquid fuel. Examples of the fuel supply to the engine can include natural gas, diesel, gasoline, hydrogen fuel, propane, or biodiesel. The engine can be used to power equipment used during a wellsite operation (e.g., a drilling operation, completion operation, hydraulic fracturing operation, etc.) at the wellsite. For example, if the wellsite operation is a hydraulic fracturing operation, the equipment can include hydraulic fracturing trucks and cementing equipment. In some examples, the fuel supply can be transported within a fuel supply line (e.g., a pipe system) of the wellsite, for example if the wellsite includes a wellbore that can produce natural gas. Additionally or alternatively, a fuel tank may be used to provide the fuel supply to the engine of the equipment at the wellsite.

The monitoring system can include a sensor apparatus with one or more sensors to monitor the fuel supply for the engine. The sensor apparatus can be positioned in a fuel sampling line of the fuel supply line that is upstream of the engine such that the sensor apparatus can measure various fuel properties of the fuel supply prior to the fuel supply reaching the engine. Examples of the fuel properties can include temperature, pressure, flow rate, fluid density, methane number, total impurity (e.g., sulfur, halogens, ammonia, etc.) content, relative humidity, or hydrocarbon condensate. In some implementations, the fuel properties may be referred to as fuel quality parameters. The fuel sampling line can divert a portion of the fuel supply transported in the fuel supply line to the sensor apparatus such that the sensor apparatus can measure fuel properties associated with this portion of the fuel supply. In some examples, the fuel sampling line may be positioned in line with the fuel supply line. Alternatively, the fuel sampling line can be positioned parallel to the fuel supply line.

Additionally, the monitoring system can include a computing device (e.g., a data acquisition device) communicatively coupled with the sensor apparatus via a wired or wireless connection. The computing device can receive a fuel property measurement of the fuel supply from the sensor apparatus. In some instances, the computing device may store the fuel property measurement, for example to monitor the fuel properties of the fuel supply over time. Additionally or alternatively, the fuel property measurement may be used to calculate additional values. For example, fuel temperature or pressure may be used to estimate or calculate a density of the fuel supply.

Inconsistent fuel quality of the fuel supply can result in engine derates or shutdowns of the equipment during the wellsite operation. In some instances, the fuel quality of the fuel supply may vary over time or due to different suppliers of the fuel supply. The engine derates can refer to a reduction of an output of the engine due to inadequate operating conditions resulting from the inconsistent fuel quality of the fuel supply. The engine may require a fuel supply that is within a relatively narrow range of fuel properties to provide a predefined level of performance. Accordingly, the fuel properties of the fuel supply being outside of a predefined range (e.g., below or above the predefined range) may cause a reduction in the performance of the engine.

By measuring the fuel properties of the fuel supply prior to combustion of the fuel supply in the engine, the monitoring system can enable timely adjustments to the fuel supply before the inconsistent fuel quality affects the engine. The monitoring system can monitor the fuel properties of the fuel supply in relatively close proximity to the fuel supply instead of having to transport samples to an off-site laboratory or testing location. For example, the monitoring system may employ a process loop, buffer chamber, dwell chamber, or a slipstream to divert part of the fuel supply away from a main supply to sample the fuel supply and determine the fuel properties. The relatively close proximity of the monitoring system can reduce time taken between detecting inconsistent fuel quality and implementing a corrective action (e.g., a mitigation operation) to address the inconsistent fuel quality. Thus, the fuel properties of the fuel supply can be improved prior to the engine being shut down or derated on power.

Adjusting the fuel supply may involve adding an additive (e.g., an anti-knock agent) to the fuel supply to improve a fuel property measurement (e.g., octane number) of the fuel supply. As another example, adjusting the fuel supply may involve mixing another fuel supply with the existing fuel supply to create a blended fuel supply with fuel properties within the predefined range. The monitoring system can control or modulate the fuel blending process to ensure that the blended fuel supply can enable the engine to operate at or above the target performance level. In addition to adjusting the fuel supply, the monitoring system may transmit the fuel property measurement to a control system associated with the engine, for example to inform the control system regarding the fuel quality of the fuel supply. Based on the fuel quality, the control system can modify engine operating parameters, such as ignition timing, fuel injection timing or duration, or throttling valve position.

The sensor apparatus of the monitoring system can be mounted in a repository (e.g., a buffer chamber, accumulator, dwell chamber, etc.) using an inline arrangement with respect to the fuel supply line. In other implementations, the sensor apparatus may be positioned using a parallel arrangement or branching off of the fuel supply line. As the fuel supply passes by the sensor apparatus or is stored in the repository, the sensor apparatus can measure the fuel properties of the fuel supply. Thus, the sensor apparatus can provide direct feedback to unit controls associated with the equipment of the wellsite that can initiate one or more corrective actions to modify fuel properties of the fuel supply. In some instances, the corrective actions may include modifying the engine operating parameters associated with the engine of the equipment. Additionally or alternatively, the corrective actions can include implementing fuel blending operations to improve the fuel properties of the fuel supply by adding additives or injecting high-quality fuel to the fuel supply.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellsite 100 that includes a monitoring system 102 for a gaseous fuel supply 104 to an engine 106 according to one example of the present disclosure. The wellsite 100 can include a wellbore 108 extending from a surface 110 of the wellsite 100 through various earth strata. The strata can include different materials (e.g., rock, soil, oil, water, or gas) and can vary in thickness and shape. For example, the wellbore 108 may extend through a subterranean formation 112 bearing natural gas or suitable gaseous fuel. In some examples, the wellsite 100 may include more than one wellbore 108.

A tubing string 114 can extend from the surface 110 into the wellbore 108. The tubing string 114 can provide a conduit for gaseous fuel extracted from the subterranean formation 112 to travel from the subterranean formation 112 to the surface 110. The gaseous fuel can be transported through the tubing string 114 to the surface 110 such that one or more equipment 116 that have a gas-consuming engine 106 can be powered using the gaseous fuel. The equipment 116 may be equipment used during wellbore operations (e.g., drilling operations, fracking operations, or completion operations). In some examples, the gaseous fuel can flow directly from the subterranean formation 112 to the equipment 116 such that the equipment 116 can operate at least in part using the gaseous fuel from the wellbore 108.

Additionally or alternatively, the gaseous fuel can flow from the subterranean formation 112 to the surface 110 and be processed or collected prior to being used as fuel for the equipment 116. In some cases, the gaseous fuel may be stored in a tank or another suitable storage container prior to being used as fuel for the equipment 116. If the gaseous fuel is natural gas, the natural gas may be processed prior to storage to ease transport. For example, the natural gas may be compressed to form compressed natural gas (CNG) or cooled to form liquefied natural gas (LNG).

As another example, the gaseous fuel extracted from the subterranean formation 112 may flow to gas conditioning equipment positioned at the surface 110. The gas conditioning equipment can remove liquids present in the natural gas to avoid engine damage of the equipment 116. In some implementations, a monitoring system 102 can be positioned in a flow path 118 between the gas conditioning equipment and the equipment 116 having a gas-consuming engine 106. This arrangement can enable the monitoring system 102 to prevent damage to the equipment 116 if the gas conditioning equipment fails to remove sufficient liquid from the gaseous fuel. For example, if the monitoring system 102 detects residual liquid present in the gaseous fuel, the monitoring system 102 may implement a corrective action by rerouting the gaseous fuel to receive additional treatment from the gas conditioning equipment.

The monitoring system 102 may monitor one or more fuel supply parameters of the gaseous fuel with respect to a predefined range associated with a performance level of the engine. Examples of the fuel property measurements can include total sulfur content, total halogen content, total ammonia content, temperature, or other suitable parameters of the gaseous fuel. Upon detecting that a fuel property measurement is outside of the predefined range, the monitoring system 102 may implement a mitigation operation to adjust the fuel supply parameter to be within the predefined range.

Figure 2:
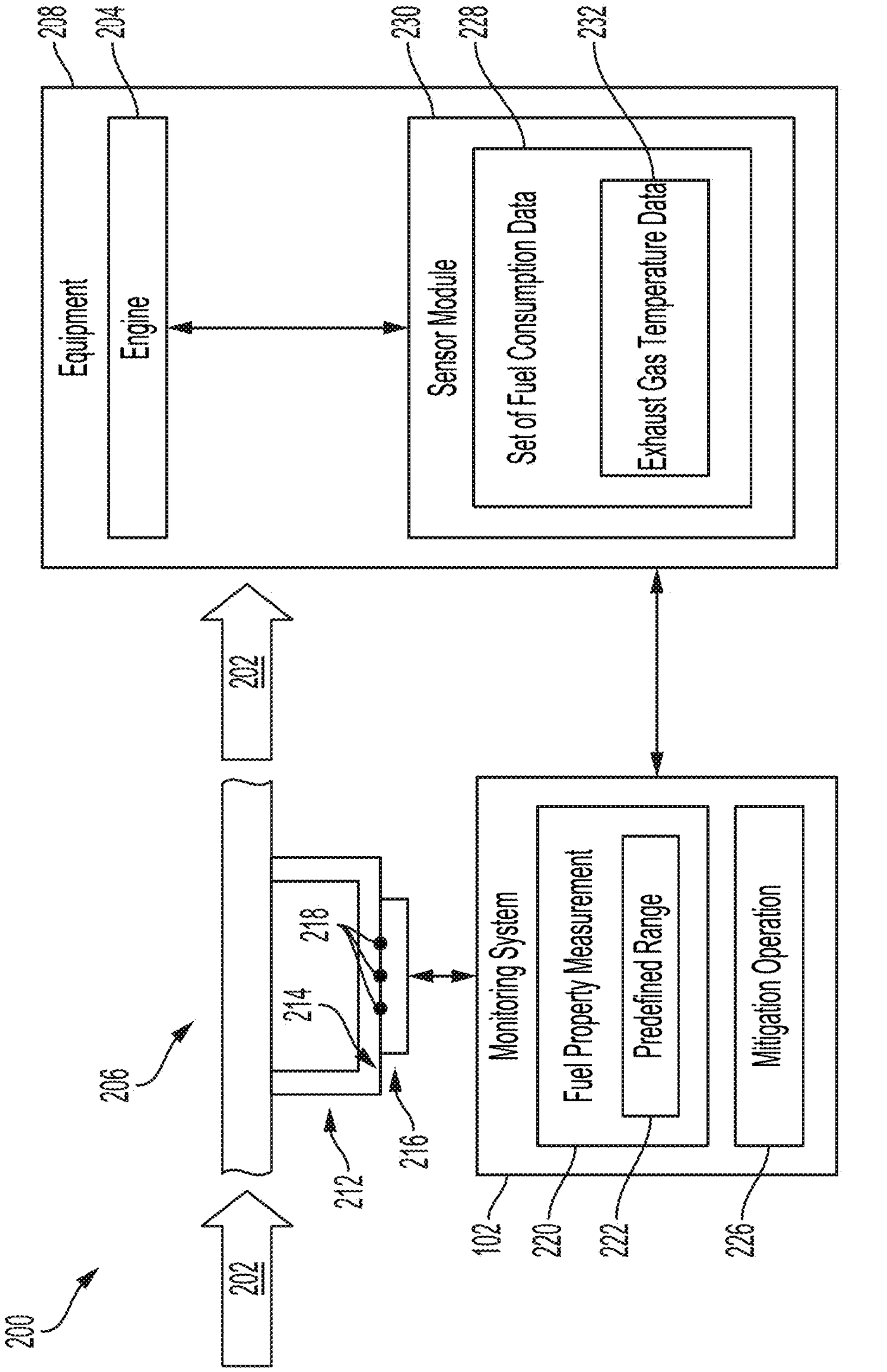
FIG. 2 is a block diagram of a monitoring system for a gaseous fuel supply to an engine at a wellbore according to one example of the present disclosure.

FIG. 2 is a block diagram 200 of a monitoring system 102 for a fuel supply 202 to an engine 204 at a wellbore (e.g., the wellbore 108 of FIG. 1) according to one example of the present disclosure. The fuel supply 202 can be transported to the engine 204 via a fuel supply line 206 to power the engine 204 and cause an equipment 208 (e.g., the equipment 116 of FIG. 1) to perform an action of a wellsite operation. For example, if the equipment 208 is a blender used to prepare a slurry of a stimulation treatment for a completion operation, the fuel supply 202 may be used to drive the engine 204 of the blender to mix the slurry at a suitable treatment rate. As depicted in FIG. 2, the fuel supply line 206 may be a pipeline used to transport the fuel supply 202 is transported from a fuel source through the fuel supply line 206 to the equipment 208. In some examples, the fuel source of the fuel supply 202 may be the wellbore at which the equipment 208 is positioned. Additionally or alternatively, the fuel supply 202 may be stored in a tank or other suitable container at a wellsite (e.g., the wellsite 100 of FIG. 1).

As the fuel supply 202 flows through the fuel supply line 206, a fuel sampling line 212 may divert a portion 214 of the fuel supply 202 from the fuel supply line 206 to a sensor apparatus 216 including one or more sensors 218. The sensors 218 of the sensor apparatus 216 can measure fuel properties of the fuel supply 202 using the portion 214 of the fuel supply 202. The fuel properties of the fuel supply 202 can include at least one fuel property measurement 220 (e.g., methane number, total impurity content, temperature, relatively humidity, hydrocarbon condensate, etc.) that can contribute to a fuel quality of the fuel supply 202. Examples of impurities in the fuel supply 202 can include sulfur, ammonia, or halogens (e.g., chlorine, bromine, fluorine, or iodine). In some examples, the sensors 218 may be infrared gas quality sensors that can measure a chemical composition of the fuel supply 202 by sampling the portion 214 of the fuel supply 202. Additionally or alternatively, the sensor apparatus 216 may implement other analytical techniques (e.g., mass spectroscopy, nuclear magnetic resonance (NMR) analysis, acoustic analysis, ultrasonic analysis, etc.) to characterize the fuel supply 202. If the fuel property measurement 220 is outside of a predefined range 222, the engine 204 may be unable to operate at a target performance level 224. As a result, the monitoring system 102 may implement a mitigation operation 226 to improve the fuel property measurement 220 such that the engine 204 can use the fuel supply 202 to operate at the target performance level 224.

In some examples, as depicted in FIG. 2, a portion 214 of the fuel supply 202 may be diverted from the fuel supply line 206 to a fuel sampling line 212 positioned parallel to the fuel supply line 206. The sensor apparatus 216 can take measurements of the portion 214 of the fuel supply 202 passing through the fuel sampling line 212. The portion 214 of the fuel supply 202 may flow through the fuel sampling line 212 to rejoin the fuel supply 202 in the fuel supply line 206. Thus, if the sensor apparatus 216 measures the portion 214 of the fuel supply 202 in predefined intervals (e.g., minutes, hours, etc.), the measurements of the sensor apparatus 216 can be used to track the fuel property measurement 220 over time. Accordingly, the sensor apparatus 216 can be used to monitor the fuel supply 202 substantially contemporaneously (i.e., in real-time).

Figure 3:
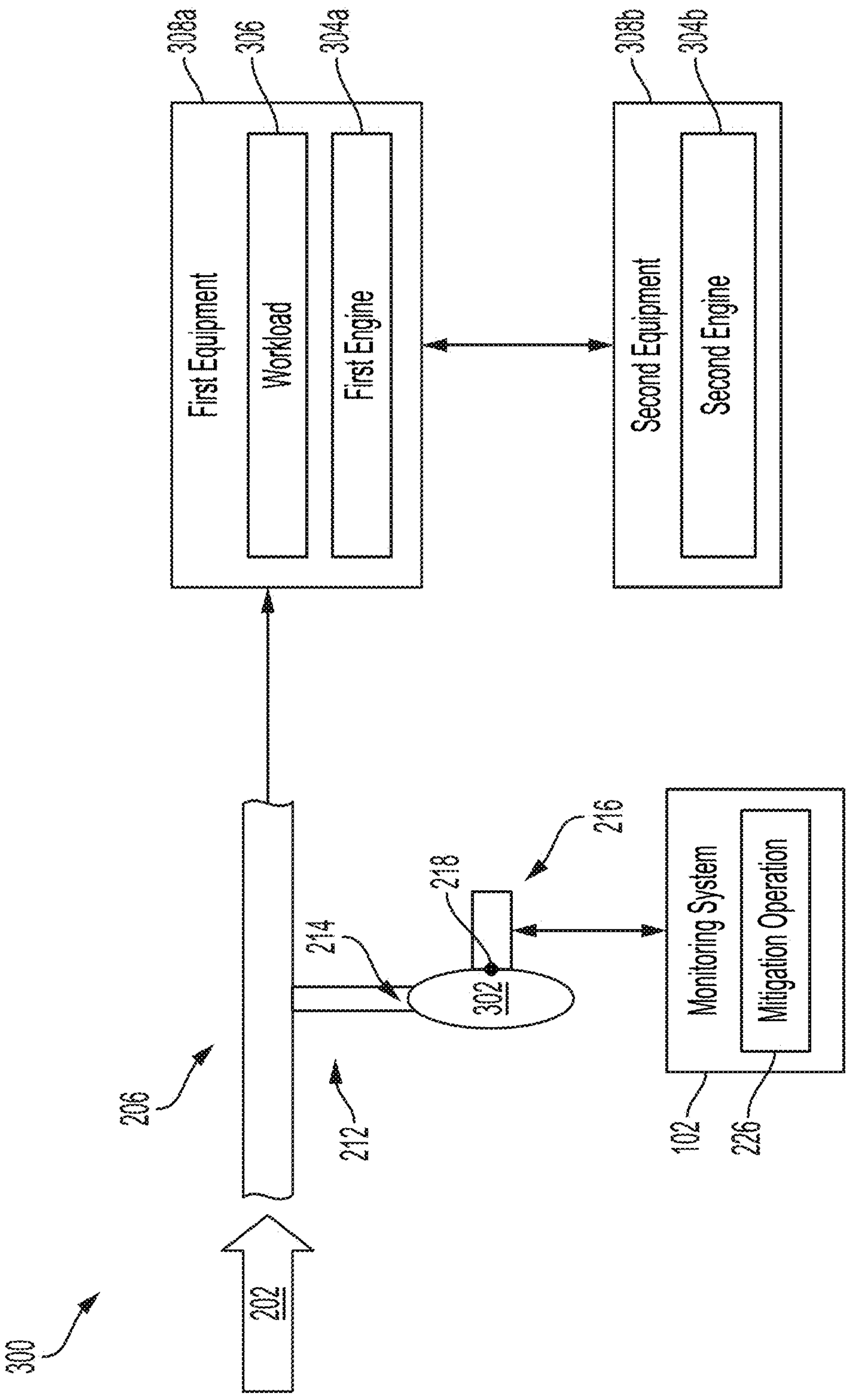
FIG. 3 is a block diagram of another monitoring system for a gaseous fuel supply to an engine at a wellbore according to one example of the present disclosure.

In some examples, such as the example depicted in FIG. 3, the portion 214 of the fuel supply 202 may be diverted from the fuel supply line 206 to a repository 302 positioned within a flow path of a fuel sampling line 212 positioned in line with the fuel supply line 206. Examples of the repository can include a buffer chamber, dwell chamber, tank, or accumulator. Although the fuel sampling line 212 is depicted in FIG. 3 as being in line with the fuel supply line 206, it is appreciated that the repository 302 can be positioned with a flow path of a fuel sampling line 212 positioned parallel to the fuel supply line 206. The repository 302 can hold the portion 214 of the fuel supply 202 for a predetermined amount of time. In some cases, if the fuel supply 202 is shut off or otherwise unavailable, the portion 214 of the fuel supply 202 that is stored in the repository 302 can be used to supplement the fuel supply 202 used to power equipment 308*a-b*.

In some examples, as depicted in FIG. 3, the fuel supply 202 may be used to power more than one engine 304. A wellsite (e.g., the wellsite 100 of FIG. 1) may include one or more equipment 308*a-b* to perform well operations. Although FIG. 3 depicts a first equipment 308*a* and a second equipment 308*b*, it will be appreciated that any number of equipment may be positioned at the wellsite to perform the well operations. Each equipment 308 may include a respective engine 304*a-b* to enable the equipment 308 to perform an action that can contribute to a well operation at the wellsite. Additionally, in some implementations, each equipment 308 may include a respective monitoring system communicatively coupled to each engine 304. In some examples, the equipment 308*a-b* can be coupled such that the fuel supply 202 can flow to reach the second equipment 308*b* after being supplied to the first equipment 308*a*. In such examples, the first equipment 308*a* may be positioned upstream of the second equipment 308*b* with respect to the fuel supply line 206. Additionally or alternatively, additional equipment may be coupled to the equipment 308*a-b* via the fuel supply line 206 such that the fuel supply 202 can power corresponding engines of the additional equipment after being supplied to the equipment 308*a-b*.

In some examples, if the wellsite includes multiple equipment 308*a-b*, the monitoring system 102 may implement a load sharing process as the mitigation operation 226 or part of the mitigation operation 226. For example, a first equipment 308*a* may perform a wellsite operation of drilling a wellbore (e.g., the wellbore 108 of FIG. 1) using a downhole tool. The monitoring system 102 may determine that the fuel supply 202 to the first equipment 308*a* is unable to sustain a target performance level 224 of a first engine 304*a* of the first equipment 308*a*. The monitoring system 102 then may search for another equipment at the wellsite that can perform an action of the wellsite operation. Once the monitoring system 102 determines that the second equipment 308*b* is capable of performing an action of the wellsite operation associated with the first equipment 308*a*, the first engine 304*a* may share a workload 306 of performing the wellsite operation with a second engine 304*b* of the second equipment 308*b*. Accordingly, the monitoring system 102 can scale back engine performance of the first engine 304*a*. Scaling back the engine performance may involve the first engine 304*a* outputting less horsepower, torque, or the like. Thus, the first equipment 308*a* and the second equipment 308*b* may both carry out the well operation, thereby sharing a workload 306 of the action. Having the second equipment 308*b* to perform the action using a second engine 304*b* cooperating the first engine 304*a* of the first equipment 308*a* can enable the first engine 304*a* to conserve power. Thus, the first engine 304*a* splitting a workload 306 of the wellsite operation with the second engine 304*b* may decrease fuel quality requirements associated with operating the first engine 304*a* at the target performance level of the first engine 304*a*.

Additionally or alternatively, the monitoring system 102 may determine a respective operating set point associated with each of the engines 304*a-b* of the equipment 308*a-b* to implement the load sharing process. The operating set point can enable the engines 304*a-b* to operate within the predefined range 222 such that the engines 304*a-b* can deliver the workload 306 of the wellsite operation. In some examples, the monitoring system 102 may use feedback control with respect to the operating set point to ensure that a fuel property measurement 220 of the fuel supply 202 is maintained within the predefined range 222. As an example, the monitoring system 102 can modify the operating set point based on the fuel property measurement 220 of the fuel supply 202 to ensure that the engines 304*a-b* operate at the target performance level 224. Modifying the operating set point may involve adjusting engine operating parameters (e.g., ignition timing, fuel injection timing or duration, emissions catalyst control, throttling valve position, exhaust gas recirculation percentage, turbo geometry, etc.).

In some implementations, the monitoring system 102 can target the engines 304*a-b* to operate at the respective operating set point such that the engines 304*a-b* can collectively output the target performance level 224. For example, the monitoring engine 102 can determine or select a respective horsepower output for each of the engines 304*a-b* to meet a total horsepower requirement corresponding to the target performance level. Instead of only the first engine 304*a* being responsible for fulfilling the total horsepower requirement, the monitoring system 102 can have the second engine 304*b* assist the first engine 304*a* with fulfilling the total horsepower requirement. For the first engine 304*a*, the monitoring system 102 can determine a first horsepower output as a first operating set point based on the fuel quality of the fuel supply 202. Similarly, for the second engine 304*b*, the monitoring system 102 can determine a second horsepower output as a second operating set point. Accordingly, the first horsepower output and second horsepower output may be lower than the total horsepower output but can be combined to fulfill the target performance level 224 corresponding to the total horsepower requirement. In some cases, the first operating set point may differ from the second operating set point. Alternatively, in some examples, the first operating set point may be the same as the second operating set point.

Returning to FIG. 2, the sensor apparatus 216 can be communicatively coupled with a monitoring system such that the sensor apparatus 216 can transmit measurements taken by the sensors 218 to the monitoring system 102. The monitoring system 102 can analyze the measurements of the portion 214 of the fuel supply 202 to determine that at least one fuel property measurement 220 of the fuel supply 202 is outside of a predefined range 222. In some examples, the predefined range 222 can be specific to a type of the engine 204, for example based at least in part on a horsepower of the engine 204 or a type of fuel consumed by the engine 204. The predefined range 222 can define a minimum value and a maximum value between which the fuel property measurement 220 can enable the engine 204 to operate at a target performance level (e.g., a specific horsepower, torque, etc.). If the fuel property measurement 220 is outside of the predefined range 222, the engine 204 may malfunction (e.g., shut down) or experience engine derates due to the fuel supply 202 being suboptimal.

For example, a fuel temperature of the fuel supply 202 may be below the minimum value of the predefined range 222, causing fuel volume of the fuel supply 202 to fluctuate. As another example, a relative humidity of the fuel supply 202 may be above the maximum value of the predefined range 222 that can indicate a threshold above which water is suspended in the fuel supply 202. Once the relatively humidity is above the maximum value of the predefined range 222, water may begin to flow freely in the fuel supply line 206, contributing to degradation associated with the fuel supply line 206. Examples of the degradation can include microbial growth, corrosion of the fuel supply line 206 or the engine 204, or fuel injector failure.

In some examples, the monitoring system 102 may determine that the fuel property measurement 220 is outside of the predefined range 222 at least in part using a set of fuel consumption data 228 associated with the engine 204. For example, the equipment 208 may include a sensor module 230 that can collect emissions data of the fuel supply 202 after the fuel supply 202 is consumed (e.g., burned or combusted) by the engine 204. As another example, the sensor module 230 may obtain exhaust gas temperature data 232 from the engine 204 after the engine 204 begins to consume the fuel supply 202. In some implementations, the monitoring system 102 can use the set of fuel consumption data 228 to confirm that the fuel property measurement 220 is outside of the predefined range 222. For example, the monitoring system 102 may analyze the set of fuel consumption data 228 in conjunction with measurements of the fuel property measurement 220 to confirm that the fuel property measurement 220 is outside the predefined range 222.

Once the monitoring system 102 detects that the fuel property measurement 220 is outside of the predefined range 222, the monitoring system 102 can implement the mitigation operation 226 to improve the fuel property measurement 220. In some examples, the mitigation operation 226 may involve adjusting an operating parameter of the engine 204 based on the fuel property measurement 220 being outside of the predefined range 222. Examples of the operating parameter can include ignition timing, fuel injection timing, fuel injection duration, fuel temperature, fuel pressure, exhaust gas recirculation percentage, emissions catalyst control, or throttling valve position. Additional examples of the operating parameter can include turbo geometry or variable compressor vanes.

Additionally or alternatively, the mitigation operation 226 may involve modifying the fuel supply 202 to improve the fuel property measurement 220. Another equipment (e.g., a heater, condenser, pump, distillation column, separator, or any other suitable equipment) may be used to improve the fuel property measurement 220. For example, if the fuel temperature of the fuel supply 202 is outside of the predefined range 222, the fuel supply 202 may undergo a heating process or a cooling process in a heat exchanger to improve the fuel temperature of the fuel supply 202. As another example, if a relative humidity of the fuel supply 202 is above the maximum value of the predefined range 222, the mitigation operation 226 may involve using gas conditioning equipment to remove liquids present in the fuel supply 202. In some cases, an additive (e.g., a corrosion inhibitor, plasticizer, lubricant, oxygenates, antioxidants, etc.) may be added to the fuel supply 202 to improve the fuel property measurement 220.

Figure 4:
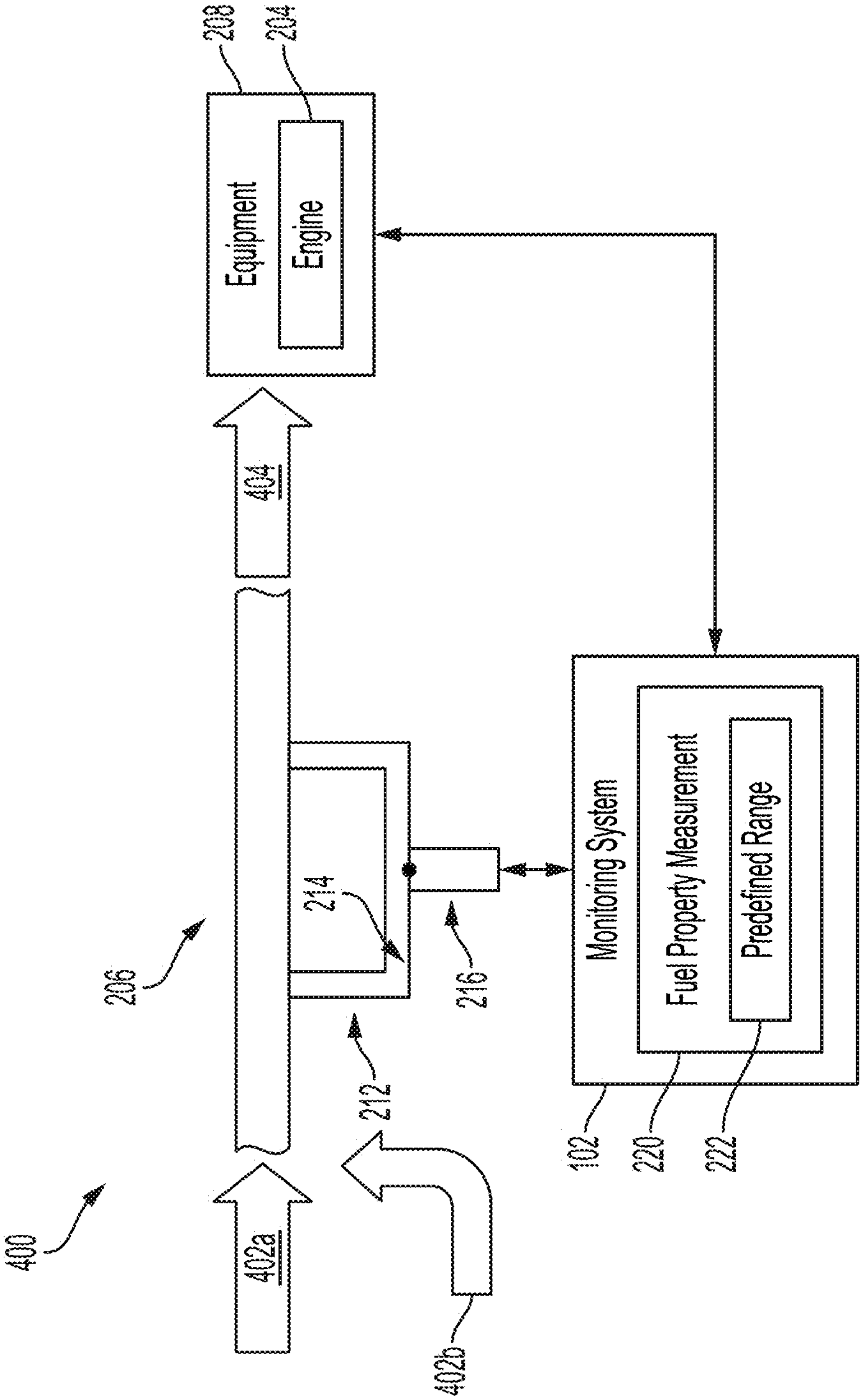
FIG. 4 is a block diagram of a monitoring system including a fuel blending process for a gaseous fuel supply to an engine at a wellbore according to one example of the present disclosure.

Additionally or alternatively, the monitoring system 102 may perform a fuel blending operation to combine one or more fuel supplies to generate a blended fuel supply having a fuel property measurement 220 within the predefined range 222. For example, as depicted in FIG. 4, the fuel blending operation may involve mixing a first fuel supply 402*a* with a second fuel supply 402*b* to create a blended fuel supply 404 that can be combusted in the engine 204. In some examples, the monitoring system 102 may identify the second fuel supply 402*b* to combine with the first fuel supply 402*a* that has a fuel property measurement 220 outside of the predefined range 222. Identifying the second fuel supply 402*b* may involve determining whether certain physical properties (e.g., density, miscibility, combustibility, etc.) of the second fuel supply 402*b* are compatible with physical properties of the first fuel supply 402*a*. Once the monitoring system 102 identifies the second fuel supply 402*b*, the monitoring system 102 may calculate an amount (e.g., a volume) of the second fuel supply 402*b* to combine with the first fuel supply 402*a*, for example to reach a particular molar gas fraction.

In some implementations, the second fuel supply 402*b* may be injected into the fuel supply line 206 that is used to transport the first fuel supply 402*a*. By injecting the second fuel supply 402*b* into the fuel supply line 206, the first fuel supply 402*a* and the second fuel supply 402*b* can mix to form the blended fuel supply 404. Additionally or alternatively, the first fuel supply 402*a* and the second fuel supply 402*b* may be combined using specialized equipment (e.g., a mixer) to ensure that the blended fuel supply 404 is well-mixed (e.g., homogenous).

Figure 5:
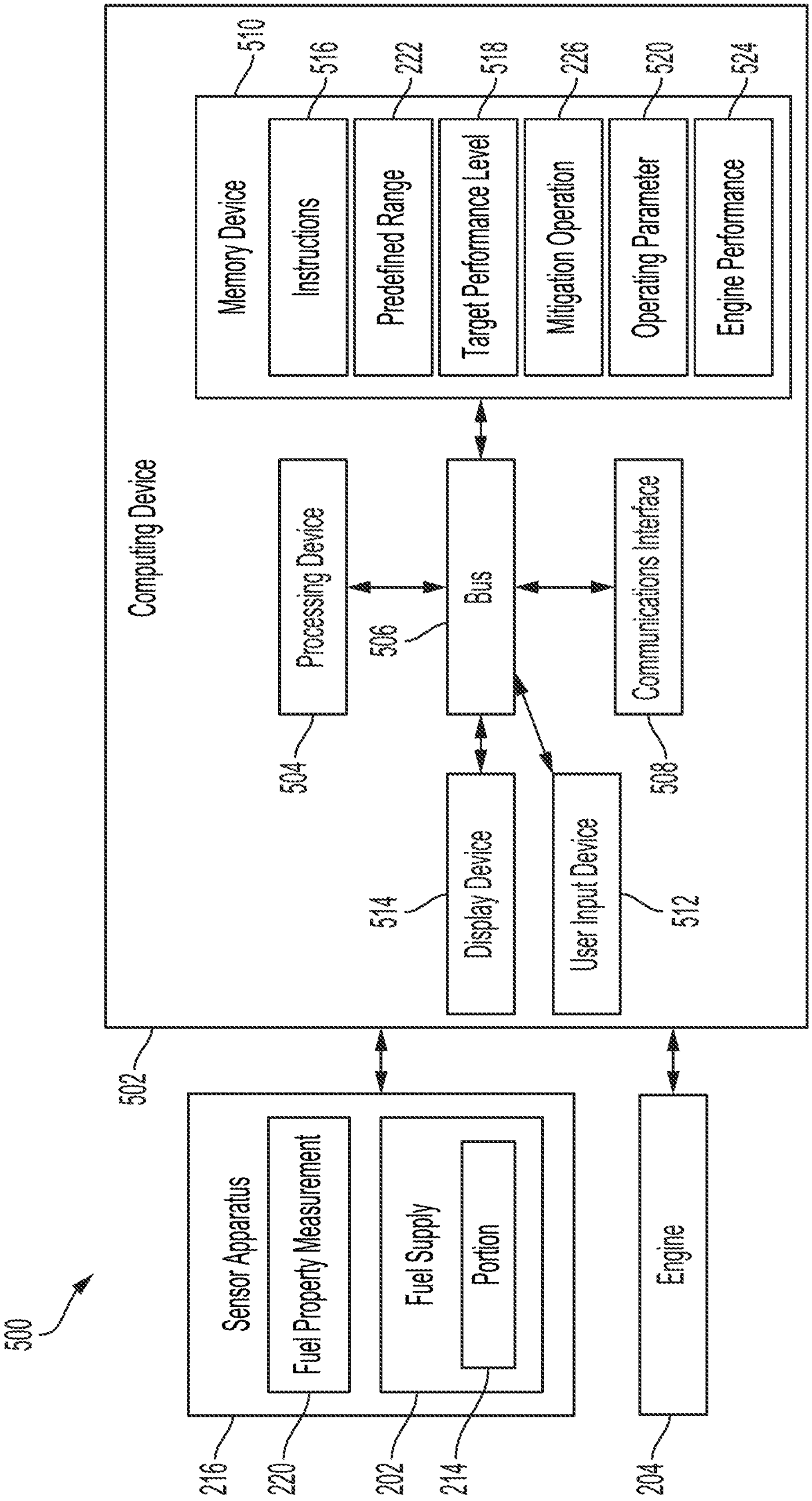
FIG. 5 is a block diagram of a computing device for monitoring a gaseous fuel supply to an engine at a wellbore according to one example of the present disclosure.

FIG. 5 is a block diagram 500 of a computing device 502 for monitoring a gaseous fuel supply to an engine 204 at a wellbore (e.g., the wellbore 108 of FIG. 1) according to one example of the present disclosure. In some examples, the gaseous fuel supply can be the gaseous fuel supply supplied to an engine used to power equipment, as depicted in FIGS. 2-4. The computing device 502 can be part of a monitoring system (e.g., the monitoring system 102 of FIGS. 2-4) that can monitor fuel supply to the engine 204. In some examples, the computing device 502 can be positioned on each engine-powered equipment at the wellbore such that a respective computing device of each equipment can monitor the fuel supply to each engine of the equipment. As another example, the computing device 502 may be positioned on certain engine-powered equipment such that the computing device(s) 502 can monitor more than one engine of the engine-powered equipment at the wellbore. Additionally or alternatively, the computing device 502 can be separate from a central control system (e.g., a data van) that provides supervisory controls for the engine-powered equipment at the wellbore or a wellsite.

The computing device 502 can include a processing device 504, a bus 506, a communication interface 508, a memory device 510, a user input device 512, and a display device 514. In some examples, some or all components shown in FIG. 5 can be integrated into a single structure, such as a single housing. In other examples, some or all of the components shown in FIG. 5 can be distributed (e.g., in separate housings) and in communication with each other. The processing device 504 can execute one or more operations to monitor a fuel supply 202 for the engine 204 of the equipment 208 depicted in FIG. 1. The processing device 504 can execute instructions 516 stored in the memory device 510 to perform the operations. The processing device 504 can include one processing device or multiple processing devices. Non-limiting examples of the processing device 504 include a field-programmable gate array (FPGA), an application-specific integrated circuit (ASIC), a processor, a microprocessing device, etc.

The processing device 504 depicted in FIG. 5 is communicatively coupled to the memory device 510 via the bus 506. The non-transitory memory device 510 may include any type of memory device that retains stored information when powered off. Non-limiting examples of the memory device 510 include electrically erasable and programmable read-only memory (EEPROM), flash memory, or any other type of non-volatile memory. In some examples, at least some of the memory device 510 can include a non-transitory computer-readable medium from which the processing device 504 can read instructions 516. A computer-readable medium can include electronic, optical, magnetic, or other storage devices capable of providing the processing device 504 with computer-readable instructions or other program code. Non-limiting examples of a computer-readable medium include (but are not limited to) magnetic disk(s), memory chip(s), read-only memory (ROM), random access memory (RAM), an ASIC, a configured processing device, optical storage, or any other medium from which a computer processing device can read instructions 516. The instructions 516 can include processing device-specific instructions generated by a compiler or an interpreter from code written in any suitable computer-programming language, including, for example, C, C++, C#, etc.

In some examples, the computing device 502 includes a communication interface 508. The communication interface 508 can represent one or more components that facilitate a network connection or otherwise facilitate communication between electronic devices. Examples include, but are not limited to, wired interfaces such as Ethernet, USB, IEEE 1394, or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 502 includes a user input device 512. The user input device 512 can represent one or more components used to input data or adjust settings of the computing device 502. Examples of the user input device 512 can include a keyboard, mouse, touchpad, button, or touch-screen display. In some examples, the computing device 502 includes a display device 514. Examples of the display device 514 can include a liquid-crystal display (LCD), a television, a computer monitor, or a touch-screen display. In some examples, the user input device 512 and the display device 514 can be a single device, such as a touch-screen display.

The computing device 502 can receive one or more measurements with respect to at least one fuel property measurement 220 of the fuel supply 202 from a sensor apparatus 216. The measurements can be transmitted as electric signals to the computing device 502. Based on the measurements received from the sensor apparatus 216, the processing device 504 of the computing device 502 can determine whether the fuel property measurement 220 of the fuel supply 202 is outside of a predefined range 222. If the fuel property measurement 220 is within the predefined range 222, the engine 204 can use the fuel supply 202 to operate at a target performance level 518. Alternatively, if the fuel property measurement 220 is outside of the predefined range 222, the engine 204 may perform at a lower performance level than the target performance level 518. For example, if the engine 204 is used to power a blender used to prepare a slurry of a stimulation treatment, the target performance level 518 can be associated with a homogeneity of the slurry. If the fuel property measurement 220 is outside of the predefined range 222, the engine 204 may be unable to provide sufficient power for the blender to homogenize the slurry.

If the processing device 504 determines that the fuel property measurement 220 is outside of the predefined range 222, the processing device 504 can implement a mitigation operation 226 to improve the fuel supply 202. For example, the mitigation operation 226 may involve using a separator (e.g., a distillation column, flash separator, absorption column etc.) to remove impurities from the fuel supply 202. Examples of the impurities can include water, sulfur, ammonia, halogens, or other chemical compounds that can affect a combustion of the fuel supply 202. As another example, the mitigation operation 226 may involve adjusting emissions catalyst control as an operating parameter 520 of the engine 204. If the fuel property measurement 220 is outside of the predefined range 222, estimated emissions from combusting the fuel supply 202 may be inaccurate. Thus, based on the fuel property measurement 220 measured for the fuel supply 202, the processing device 504 can adjust an amount of the emissions catalyst to ensure compliance with emissions regulations. For example, if a lower heating value (LHV) or Wobbe index (WI) of the fuel supply 202 is outside of the predefined range 222, NOx emission levels from using the fuel supply 202 may be higher than predicted. Accordingly, the processing device 504 can increase the amount of the emissions catalyst to lower the NOx emission levels. Additionally or alternatively, the processing device 504 may adjust an exhaust gas recirculation (EGR) percentage to control the NOx emission levels.

Additionally or alternatively, the processing device 504 may predict an engine performance 524 of the engine 204 based on the fuel property measurement 220 being outside of (e.g., above or below) the predefined range 222. For example, the processing device 504 may predict that the engine performance 524 is 80% of the target performance level 518. Accordingly, the processing device 504 can modify the operating parameter 520 of the engine 204 based on the predicted engine performance 524. As an example, the fuel property measurement 220 may correspond to an amount of nitrogen gas in the fuel supply 202. If the processing device 504 determines that the amount of nitrogen gas is above the predefined range 222, the processing device 504 may predict the engine performance 524 based on the amount of nitrogen gas detected in the fuel supply 202. Once the processing device 504 determines the predicted engine performance 524, the processing device 504 may output an alert to an operator to warn the operator about the predicted engine performance being below the target performance level 518. Additionally or alternatively, the processing device 504 may automatically modify an ignition timing of the engine 204 based on the predicted engine performance 524 to adjust an operating parameter 520 of the engine 204.

Figure 6:
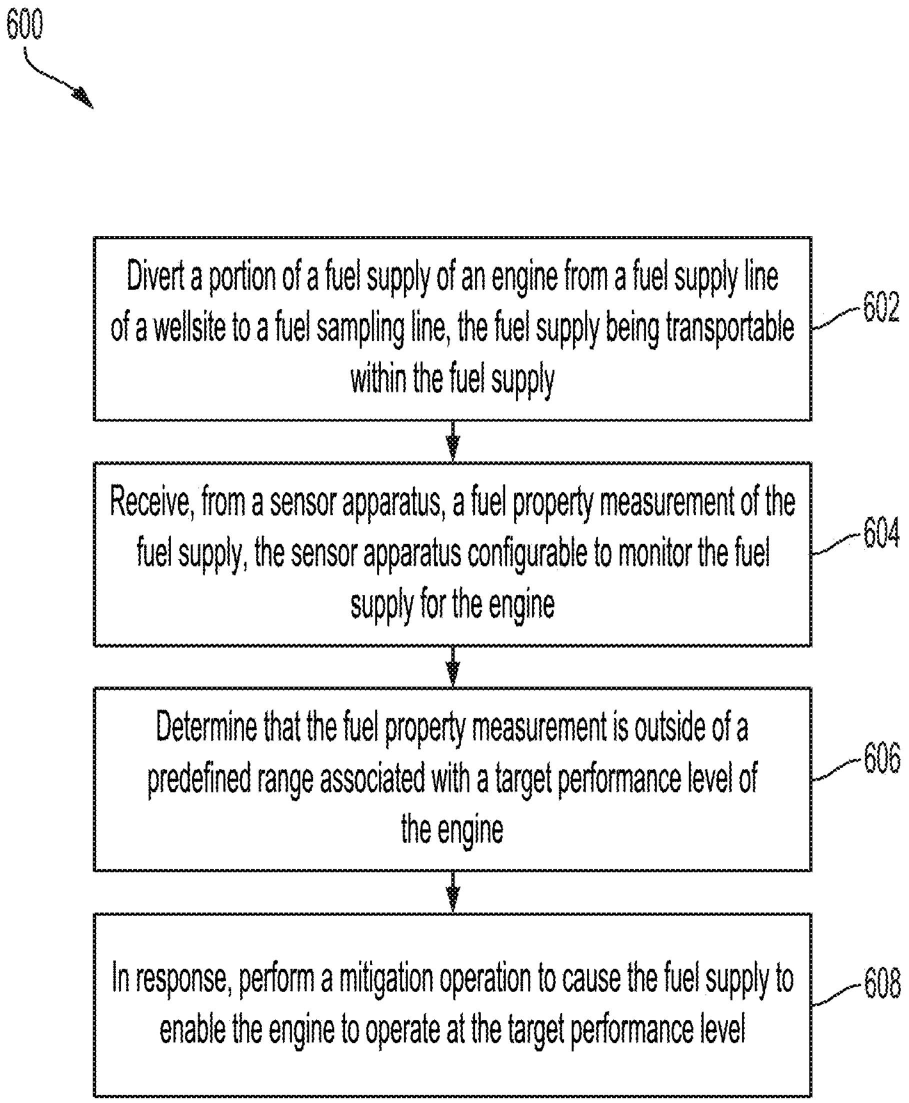
FIG. 6 is a flowchart of a process for monitoring a gaseous fuel supply to an engine at a wellbore according to one example of the present disclosure.

FIG. 6 is a flowchart of a process 600 for monitoring a fuel supply 202 to an engine 204 at a wellbore 108 according to one example of the present disclosure. While FIG. 6 depicts a certain sequence of steps for illustrative purposes, other examples can involve more steps, fewer steps, different steps, or a different order of steps depicted in FIG. 6. The process 600 is described with reference to components shown in FIGS. 1-5.

At block 602, the processing device 504 diverts a portion 214 of the fuel supply 202 of the engine 204 from a fuel supply line 206 to a fuel sampling line 212. By diverting the portion 214 of the fuel supply 202 to the fuel sampling line 212, the processing device 504 can analyze samples collected from the fuel sampling line 212 to monitor a fuel property measurement 220 of the fuel supply 202. In some examples, the processing device 504 may use gas chromatography techniques to analyze the samples.

At block 604, the processing device 504 receives, from a sensor apparatus 216, the fuel property measurement 220 of the fuel supply 202. The sensor apparatus 216 may monitor the fuel supply 202 for the engine 204 using one or more sensors 218 that can measure the fuel property measurement 220 of the portion 214 of the fuel supply 202. In some examples, the processing device 504 can receive a set of measurements (e.g., temperature, composition, etc.) collected by the sensors 218 of the sensor apparatus 216 to monitor the fuel property measurement 220 of the fuel supply 202. Using the set of measurements, the processing device 504 can calculate or estimate the fuel property measurement 220 of the fuel supply 202. For example, gas chromatography data collected by the sensor apparatus 216 can be used to identify a chemical composition of the fuel supply 202, such as a total sulfur, ammonia, or halogen content.

At block 606, the processing device 504 determines that the fuel property measurement 220 is outside of a predefined range 222 associated with a target performance level 518 of the engine 204. In some examples, the processing device 504 may use the predefined range 222 of the fuel supply 202 stored in a memory device 510 to compare with the fuel property measurement 220. The processing device 504 then can determine whether the fuel property measurement 220 is outside the predefined range 222. In some examples, the processing device 504 may generate an alert (e.g., a notification or warning) to notify an operator that the fuel property measurement 220 is outside of the predefined range 222.

At block 608, in response to determining that the fuel property measurement 220 is outside of the predefined range 222, the processing device 504 performs a mitigation operation 226 to cause the fuel supply 202 to enable the engine 204 to operate at the target performance level 518. In some examples, performing the mitigation operation 226 may involve automatically modifying the fuel supply 202 by adding a different chemical component (e.g., an additive or another fuel supply) to the fuel supply 202. Additionally or alternatively, the processing device 504 may automatically modify an operating parameter 520 of the engine 204 based on the fuel property measurement 220 being outside of the predefined range 222.

In some aspects, a system, method, and non-transitory computer-readable medium for a monitoring system of a gaseous fuel supply to an engine at a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: an engine of an equipment configurable to perform a wellsite operation at a wellsite; a fuel supply line coupled to the engine of the equipment for transporting a fuel supply; a sensor apparatus configurable to monitor the fuel supply for the engine, the sensor apparatus positionable upstream of the engine with respect to the fuel supply line; a processing device communicatively couplable to the sensor apparatus; and a memory device that includes instructions executable by the processing device for causing the processing device to perform operations comprising: diverting a portion of the fuel supply of the engine from the fuel supply line to a fuel sampling line; receiving, from the sensor apparatus, a fuel property measurement of the fuel supply; determining that the fuel property measurement is outside of a predefined range associated with a target performance level of the engine; and in response to determining that the fuel property measurement is outside of the predefined range, performing a mitigation operation to cause the fuel supply to enable the engine to operate at the target performance level.

Example 2 is the system of example(s) 1, wherein the engine is a first engine of a first equipment at the wellsite configurable to perform the wellsite operation, and wherein performing the mitigation operation further comprises: identifying a second equipment at the wellsite configurable to perform the wellsite operation; and implementing a load sharing process to share a workload of the wellsite operation between the first engine and a second engine of the second equipment.

Example 3 is the system of example(s) 1-2, wherein the fuel supply is a first fuel supply, and wherein performing the mitigation operation further comprises: identifying a second fuel supply combinable with the first fuel supply to create a blended fuel supply that enables the engine to operate at the target performance level; and combining the first fuel supply with the second fuel supply to provide the blended fuel supply to the engine.

Example 4 is the system of example(s) 1-3, wherein the operations further comprise, prior to performing the mitigation operation: predicting an engine performance of the engine based on the fuel property measurement being outside of the predefined range; determining that the predicted engine performance is below the target performance level; and modifying an operating parameter of the engine associated with the engine performance.

Example 5 is the system of example(s) 1-4, wherein the operating parameter is a fuel injection timing or ignition timing of the engine.

Example 6 is the system of example(s) 1-5, wherein the operations comprise, prior to analyzing the portion of the fuel supply using the sensor apparatus: diverting the portion of the fuel supply to a chamber configurable to retain the portion of the fuel supply for collecting at least one measurement corresponding to the fuel property measurement.

Example 7 is the system of example(s) 1-6, wherein determining that the fuel property measurement is outside of the predefined range further comprises: receiving exhaust gas temperature data collected by a sensor module for the engine; and based on the fuel property measurement and the exhaust gas temperature data, determining that the fuel property measurement is outside of the predefined range.

Example 8 is a method comprising: diverting a portion of a fuel supply of an engine from a fuel supply line of a wellsite to a fuel sampling line, the fuel supply being transported within the fuel supply line; receiving, from a sensor apparatus, a fuel property measurement of the fuel supply, the sensor apparatus configurable to monitor the fuel supply for the engine; determining that the fuel property measurement is outside of a predefined range associated with a target performance level of the engine; and in response to determining that the fuel property measurement is outside of the predefined range, performing a mitigation operation to cause the fuel supply to enable the engine to operate at the target performance level.

Example 9 is the method of example(s) 8, wherein the engine is a first engine associated with a first equipment at the wellsite configurable to perform a wellsite operation, and wherein performing the mitigation operation further comprises: identifying a second equipment at the wellsite configurable to perform the wellsite operation; and implementing a load sharing process to share a workload of the wellsite operation between the first engine and a second engine of the second equipment.

Example 10 is the method of example(s) 8-9, wherein the fuel supply is a first fuel supply, and wherein performing the mitigation operation further comprises: identifying a second fuel supply combinable with the first fuel supply to create a blended fuel supply that enables the engine to operate at the target performance level; and combining the first fuel supply with the second fuel supply to provide the blended fuel supply to the engine.

Example 11 is the method of example(s) 8-10, further comprising, prior to performing the mitigation operation: predicting an engine performance of the engine based on the fuel property measurement being outside of the predefined range; determining that the predicted engine performance is below the target performance level; and modifying an operating parameter of the engine associated with the engine performance.

Example 12 is the method of example(s) 11-11, wherein the operating parameter is a fuel injection timing or ignition timing of the engine.

Example 13 is the method of example(s) 8-12, further comprising, prior to analyzing the portion of the fuel supply using the sensor apparatus: diverting the portion of the fuel supply to a repository configurable to retain the portion of the fuel supply for collecting at least one measurement corresponding to the fuel property measurement.

Example 14 is the method of example(s) 8-13, wherein determining that the fuel property measurement is outside of the predefined range further comprises: receiving exhaust gas temperature data collected by a sensor module for the engine; and based on the fuel property measurement and the exhaust gas temperature data, determining that the fuel property measurement is outside of the predefined range.

Example 15 is a non-transitory computer-readable medium comprising instructions that are executable by a processing device for causing the processing device to perform operations comprising: diverting a portion of a fuel supply of an engine from a fuel supply line of a wellsite to a fuel sampling line, the fuel supply being transportable within the fuel supply line; receiving, from a sensor apparatus, a fuel property measurement of the fuel supply, the sensor apparatus configurable to monitor the fuel supply for the engine; determining that the fuel property measurement is outside of a predefined range associated with a target performance level of the engine; and in response to determining that the fuel property measurement is outside of the predefined range, performing a mitigation operation to cause the fuel supply to enable the engine to operate at the target performance level.

Example 16 is the non-transitory computer-readable medium of example(s) 15, wherein the engine is a first engine of a first equipment at the wellsite configurable to perform a wellsite operation, and wherein performing the mitigation operation further comprises: identifying a second equipment at the wellsite configurable to perform the wellsite operation; and implementing a load sharing process to share a workload of the wellsite operation between the first engine and a second engine of the second equipment.

Example 17 is the non-transitory computer-readable medium of example(s) 15-16, wherein the fuel supply is a first fuel supply, and wherein performing the mitigation operation further comprises: identifying a second fuel supply combinable with the first fuel supply to create a blended fuel supply that enables the engine to operate at the target performance level; and combining the first fuel supply with the second fuel supply to provide the blended fuel supply to the engine.

Example 18 is the non-transitory computer-readable medium of example(s) 15-17, wherein the operations further comprise, prior to performing the mitigation operation: predicting an engine performance of the engine based on the fuel property measurement being outside of the predefined range; determining that the predicted engine performance is below the target performance level; and modifying an operating parameter of the engine associated with the engine performance.

Example 19 is the non-transitory computer-readable medium of example(s) 15-18, wherein the operating parameter is a fuel injection timing or ignition timing of the engine.

Example 20 is the non-transitory computer-readable medium of example(s) 15-19, wherein the operations comprise, prior to analyzing the portion of the fuel supply using the sensor apparatus: diverting the portion of the fuel supply to a repository configurable to retain the portion of the fuel supply for collecting at least one measurement corresponding to the fuel property measurement.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

an engine of an equipment configurable to perform a wellsite operation at a wellsite;

a fuel supply line coupled to the engine of the equipment for transporting a fuel supply;

a sensor apparatus configurable to monitor the fuel supply for the engine, the sensor apparatus positionable upstream of the engine with respect to the fuel supply line;

a processing device communicatively couplable to the sensor apparatus; and a memory device that includes instructions executable by the processing device for causing the processing device to perform operations comprising:

diverting a portion of the fuel supply of the engine from the fuel supply line to a fuel sampling line;

receiving, from the sensor apparatus, a fuel property measurement of the fuel supply;

determining that the fuel property measurement is outside of a predefined range associated with a target performance level of the engine; and in response to determining that the fuel property measurement is outside of the predefined range, performing a mitigation operation to cause the fuel supply to enable the engine to operate at the target performance level.

2. The system of claim 1, wherein the engine is a first engine of a first equipment at the wellsite configurable to perform the wellsite operation, and wherein performing the mitigation operation further comprises:

identifying a second equipment at the wellsite configurable to perform the wellsite operation; and implementing a load sharing process to share a workload of the wellsite operation between the first engine and a second engine of the second equipment.

3. The system of claim 1, wherein the fuel supply is a first fuel supply, and wherein performing the mitigation operation further comprises:

identifying a second fuel supply combinable with the first fuel supply to create a blended fuel supply that enables the engine to operate at the target performance level; and combining the first fuel supply with the second fuel supply to provide the blended fuel supply to the engine.

4. The system of claim 1, wherein the operations further comprise, prior to performing the mitigation operation:

predicting an engine performance of the engine based on the fuel property measurement being outside of the predefined range;

determining that the predicted engine performance is below the target performance level; and modifying an operating parameter of the engine associated with the engine performance.

5. The system of claim 4, wherein the operating parameter is a fuel injection timing or ignition timing of the engine.

6. The system of claim 1, wherein the operations comprise, prior to analyzing the portion of the fuel supply using the sensor apparatus:

diverting the portion of the fuel supply to a chamber configurable to retain the portion of the fuel supply for collecting at least one measurement corresponding to the fuel property measurement.

7. The system of claim 1, wherein determining that the fuel property measurement is outside of the predefined range further comprises:

receiving exhaust gas temperature data collected by a sensor module for the engine; and based on the fuel property measurement and the exhaust gas temperature data, determining that the fuel property measurement is outside of the predefined range.

8. A method comprising:

diverting a portion of a fuel supply of an engine from a fuel supply line of a wellsite to a fuel sampling line, the fuel supply being transported within the fuel supply line;

receiving, from a sensor apparatus, a fuel property measurement of the fuel supply, the sensor apparatus configurable to monitor the fuel supply for the engine;

determining that the fuel property measurement is outside of a predefined range associated with a target performance level of the engine; and in response to determining that the fuel property measurement is outside of the predefined range, performing a mitigation operation to cause the fuel supply to enable the engine to operate at the target performance level.

9. The method of claim 8, wherein the engine is a first engine associated with a first equipment at the wellsite configurable to perform a wellsite operation, and wherein performing the mitigation operation further comprises:

identifying a second equipment at the wellsite configurable to perform the wellsite operation; and implementing a load sharing process to share a workload of the wellsite operation between the first engine and a second engine of the second equipment.

10. The method of claim 8, wherein the fuel supply is a first fuel supply, and wherein performing the mitigation operation further comprises:

identifying a second fuel supply combinable with the first fuel supply to create a blended fuel supply that enables the engine to operate at the target performance level; and combining the first fuel supply with the second fuel supply to provide the blended fuel supply to the engine.

11. The method of claim 8, further comprising, prior to performing the mitigation operation:

predicting an engine performance of the engine based on the fuel property measurement being outside of the predefined range;

determining that the predicted engine performance is below the target performance level; and modifying an operating parameter of the engine associated with the engine performance.

12. The method of claim 11, wherein the operating parameter is a fuel injection timing or ignition timing of the engine.

13. The method of claim 8, further comprising, prior to analyzing the portion of the fuel supply using the sensor apparatus:

diverting the portion of the fuel supply to a repository configurable to retain the portion of the fuel supply for collecting at least one measurement corresponding to the fuel property measurement.

14. The method of claim 8, wherein determining that the fuel property measurement is outside of the predefined range further comprises:

receiving exhaust gas temperature data collected by a sensor module for the engine; and based on the fuel property measurement and the exhaust gas temperature data, determining that the fuel property measurement is outside of the predefined range.

15. A non-transitory computer-readable medium comprising instructions that are executable by a processing device for causing the processing device to perform operations comprising:

diverting a portion of a fuel supply of an engine from a fuel supply line of a wellsite to a fuel sampling line, the fuel supply being transportable within the fuel supply line;

receiving, from a sensor apparatus, a fuel property measurement of the fuel supply, the sensor apparatus configurable to monitor the fuel supply for the engine;

determining that the fuel property measurement is outside of a predefined range associated with a target performance level of the engine; and in response to determining that the fuel property measurement is outside of the predefined range, performing a mitigation operation to cause the fuel supply to enable the engine to operate at the target performance level.

16. The non-transitory computer-readable medium of claim 15, wherein the engine is a first engine of a first equipment at the wellsite configurable to perform a wellsite operation, and wherein performing the mitigation operation further comprises:

identifying a second equipment at the wellsite configurable to perform the wellsite operation; and implementing a load sharing process to share a workload of the wellsite operation between the first engine and a second engine of the second equipment.

17. The non-transitory computer-readable medium of claim 15, wherein the fuel supply is a first fuel supply, and wherein performing the mitigation operation further comprises:

identifying a second fuel supply combinable with the first fuel supply to create a blended fuel supply that enables the engine to operate at the target performance level; and combining the first fuel supply with the second fuel supply to provide the blended fuel supply to the engine.

18. The non-transitory computer-readable medium of claim 15, wherein the operations further comprise, prior to performing the mitigation operation:

predicting an engine performance of the engine based on the fuel property measurement being outside of the predefined range;

determining that the predicted engine performance is below the target performance level; and modifying an operating parameter of the engine associated with the engine performance.

19. The non-transitory computer-readable medium of claim 18, wherein the operating parameter is a fuel injection timing or ignition timing of the engine.

20. The non-transitory computer-readable medium of claim 15, wherein the operations comprise, prior to analyzing the portion of the fuel supply using the sensor apparatus:

diverting the portion of the fuel supply to a repository configurable to retain the portion of the fuel supply for collecting at least one measurement corresponding to the fuel property measurement.

* * * * *